No. 630,047. Patented Aug. 1, 1899.
H. K. GILBERT.
WATER GAGE GASKET.
(Application filed Oct. 18, 1898.)
(No Model.)

Witnesses
L. C. Hills.
John. W. D. Maupin.

Inventor:
Henry K. Gilbert,
by E. H. Bond
Attorney

UNITED STATES PATENT OFFICE.

HENRY K. GILBERT, OF NIAGARA FALLS, NEW YORK, ASSIGNOR OF ONE-HALF TO CALVIN L. RANDALL, OF GIRARD, PENNSYLVANIA.

WATER-GAGE GASKET.

SPECIFICATION forming part of Letters Patent No. 630,047, dated August 1, 1899.

Application filed October 18, 1898. Serial No. 693,893. (No model.)

*To all whom it may concern:*

Be it known that I, HENRY K. GILBERT, a citizen of the United States, residing at Niagara Falls, in the county of Niagara and State of New York, have invented certain new and useful Improvements in Water-Gages; and I do hereby declare the following to be a full, clear, and exact description of the invention, such as will enable others skilled in the art to which it appertains to make and use the same.

This invention relates to certain new and useful improvements in water-gages; and it pertains more particularly to means for preventing wearing or cutting away of the sight-tube at the steam end. It is a well-known fact that the sight-tubes of water-gages will wear or become cut away at the end where the steam acts thereon. It is true that gaskets have been applied at this point, but heretofore they have failed to effectually serve the purpose for which they were intended, and notwithstanding their presence the glass has worn away. I provide a gasket which protects the glass from its upper end to a point below the nut which serves as a connection between the glass and the connection with the gage-cock, and the flange of the said gasket receives the end of such connection to form a tight packing at this point. I provide, further, a gasket which rests upon the end of the sight-glass and in some instances has a thinner portion extending down within the sight-glass, and upon this gasket is supported a small tube which extends within the sight-glass, being held out of contact therewith and serving to protect the glass from wear upon the inner surface. It will thus be seen that I thoroughly and effectually protect the glass at all points where it is liable to be worn or cut away, and thus the life of the glass is materially lengthened.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1:
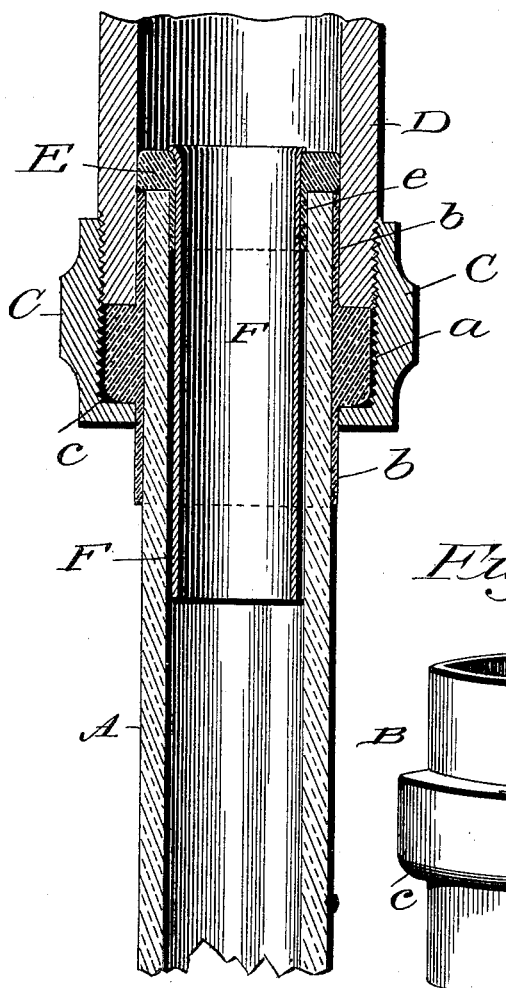
Figure 2:
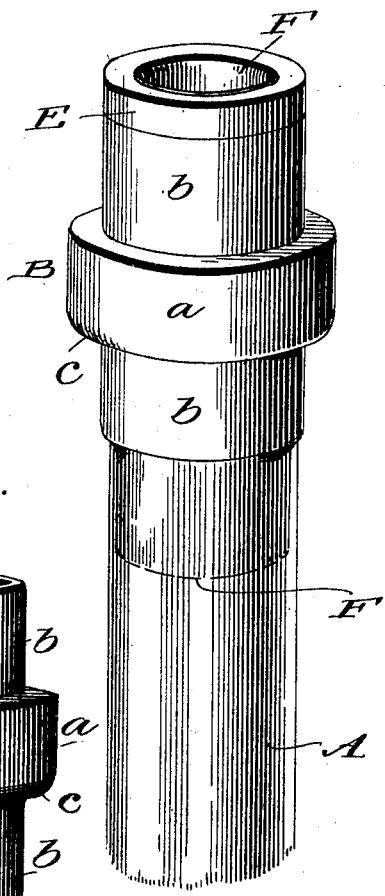
Figure 3:
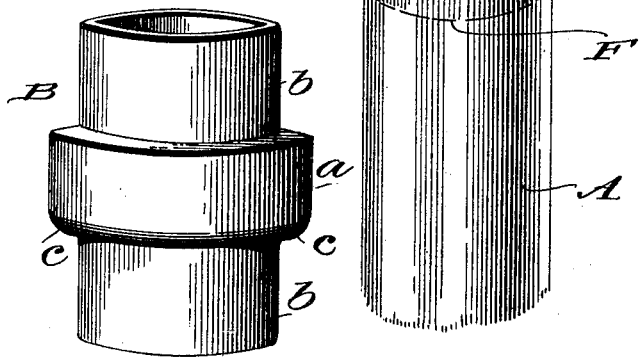

Figure 1 is a vertical section through a portion of a sight-glass of a water-gage, showing the application of my invention. Fig. 2 is a perspective view of the upper portion of the sight-glass, with my improvements in position. Fig. 3 is a perspective view of my improved gasket removed.

Like letters of reference indicate like parts throughout the several views.

Referring now to the details of the drawings by letter, A designates a portion of a sight-glass of a water-gage of known construction, except as hereinafter specified with relation to the manner of protecting the upper end thereof.

B is my improved gasket. It comprises a flange portion $a$, from opposite sides of which extend the thinner portions $b$, which are designed to embrace and closely hug the glass, as seen in Figs. 1 and 2, so as to be frictionally held thereupon. The under edge of this flange portion is rounded or beveled, as seen at $c$, to facilitate the application of the nut C, as will be readily understood. This gasket is preferably formed of a single piece, preferably of rubber, although other materials may be used. In practice this gasket is applied about the upper end of the sight-glass, as seen in Figs. 1 and 2, the upper end of the upper thin portion $b$ being flush with the end of the sight-glass and the lower end of the lower thin portion $b$ extending below the nut C; but it is evident that the length of these portions $b$ may be varied as may be deemed best. The nut C is applied, and the beveled lower edge $c$ of the gasket greatly facilitates this step, and the lower edge of the flange portion of the gasket rests upon the inwardly-extending portion of the nut, as seen in Fig. 1, and when the connection is made with the tube D, which is screwed into the upper portion of the nut, the lower end of said tube will rest upon the upper portion of the flange of the gasket, as seen in Fig. 2, and thus a tight joint or packing is provided. The thin portions of the gasket prevent contact of the metal tube D with the glass.

It will be seen that the central or flange portion of the gasket is of much greater thickness than the portions which project from opposite sides thereof, the said projecting portions being practically thin, and the bore or opening of the gasket is slightly smaller than the tube in connection with which it is to be employed, so that when in place upon the tube the thin portions will closely adhere to the tube and be tightly held thereto frictionally.

In order to protect the end of the sight-glass, I provide a gasket E, which rests upon the end of the tube, as seen best in Fig. 1, and also bears against the end of the upper portion b of the gasket B, as also shown in said figure.

F is a tube, of brass or other suitable material, having its upper end supported upon this gasket E in any suitable manner—such, for instance, as by flanging the upper end of the tube F, as seen in Fig. 1—and this tube extends down within the sight-glass, as seen in Figs. 1 and 2, to protect the inner surface of such glass from wear or cutting away. It is necessary that the tube F should be held out of contact with the sight-glass for obvious reasons, and in order to insure this relation of these parts I form the gasket E with a thin depending portion e, within which the said tube F is disposed, as seen best in Fig. 1.

From the above description, especially when taken in connection with the annexed drawings, it will be seen that I fully protect the upper end of the sight-glass both upon the inside and outside and that the means employed for this purpose are easy of application and must necessarily lengthen the life of the glass.

Modifications in detail may be resorted to without departing from the spirit of the invention or sacrificing any of its advantages.

What I claim as new is—

1. The combination with a sight-tube of a water-gage, of a gasket surrounding the same, and a gasket-seated tube supported upon the end thereof and extending within the same, as and for the purpose specified.

2. The combination with the sight-tube of a water-gage, of a gasket embracing the same and having portions extending in opposite directions from its flange, a gasket resting upon the end of the tube, and a tube depending within the sight-tube and supported by the last-mentioned gasket, as and for the purpose specified.

3. The combination with the sight-tube of a water-gage, of a tube suspended within the same, and gaskets protecting the end of the sight-tube inside and outside, substantially as specified.

4. The combination with a sight-tube of a water-gage, of a gasket surrounding the same, a gasket resting upon the end of the said tube and having a portion extending within the tube, and a tube supported upon the gasket on the end of the sight-tube and extending within the said tube out of contact therewith, substantially as and for the purpose specified.

In testimony whereof I affix my signature in presence of two witnesses.

HENRY K. GILBERT.

Witnesses:
ALEXANDER S. STEUART,
E. H. BOND.